US007996785B2

(12) United States Patent
Neil (10) Patent No.: US 7,996,785 B2
(45) Date of Patent: Aug. 9, 2011

(54) SYSTEMS AND METHODS FOR INTEGRATING APPLICATION WINDOWS IN A VIRTUAL MACHINE ENVIRONMENT

(75) Inventor: Mike Neil, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 877 days.

(21) Appl. No.: 10/882,829

(22) Filed: Jun. 30, 2004

(65) Prior Publication Data

US 2006/0005187 A1    Jan. 5, 2006

(51) Int. Cl.
G06F 3/048 (2006.01)
(52) U.S. Cl. ............. 715/778; 715/781; 715/783; 718/1
(58) Field of Classification Search .................. 715/783, 715/778, 781; 718/1
See application file for complete search history.

(56) References Cited

U.S. PATENT DOCUMENTS

| | | | | |
|---|---|---|---|---|
| 4,920,481 | A * | 4/1990 | Binkley et al. .................. | 703/26 |
| 4,939,507 | A * | 7/1990 | Beard et al. .................... | 345/156 |
| 5,673,403 | A * | 9/1997 | Brown et al. ................. | 715/744 |
| 5,790,825 | A * | 8/1998 | Traut ............................. | 712/209 |
| 6,630,943 | B1 * | 10/2003 | Nason et al. .................... | 715/746 |
| 6,658,571 | B1 | 12/2003 | O'Brien et al. ............... | 713/200 |
| 6,859,928 | B2 * | 2/2005 | Wright .......................... | 718/102 |
| 7,099,948 | B2 * | 8/2006 | Tormasov et al. ............ | 709/229 |
| 7,111,145 | B1 * | 9/2006 | Chen et al. .................... | 711/206 |
| 2002/0057295 | A1 * | 5/2002 | Panasyuk et al. ............. | 345/804 |
| 2002/0078260 | A1 | 6/2002 | Hart et al. ...................... | 719/329 |
| 2002/0099532 | A1 * | 7/2002 | Traut ............................. | 703/27 |
| 2002/0122057 | A1 * | 9/2002 | Maloney ....................... | 345/744 |
| 2002/0130900 | A1 | 9/2002 | Davis ............................ | 345/744 |
| 2002/0173863 | A1 | 11/2002 | Imada ............................ | 700/83 |
| 2003/0033443 | A1 * | 2/2003 | Igotti ............................. | 709/328 |
| 2004/0010787 | A1 * | 1/2004 | Traut et al. ........................ | 718/1 |
| 2004/0068735 | A1 * | 4/2004 | York et al. ..................... | 719/328 |
| 2004/0249947 | A1 * | 12/2004 | Novaes et al. ................. | 709/226 |
| 2004/0261038 | A1 * | 12/2004 | Ording et al. ................. | 715/792 |
| 2005/0120349 | A1 * | 6/2005 | Wright .......................... | 718/102 |
| 2005/0198632 | A1 * | 9/2005 | Lantz et al. ........................ | 718/1 |
| 2005/0240983 | A1 * | 10/2005 | Peters ............................. | 726/1 |

FOREIGN PATENT DOCUMENTS

EP    1 241 572 A2    9/2002

OTHER PUBLICATIONS

Lehrbaum, "MS Office arrives on the Linux desktop", pp. 1-10, published on Mar. 27, 2002.*
Wikipedia Definition of "Remote Desktop", p. 1; Jul. 10, 2009.*
Silberschatz A. et al., *Applied Operating System Concepts*, First Edition, John Wiley & Sons, Inc., 2000, p. 3.
Smith, J.E. et al., *Virtual Machines*, Morgan Kaufmann Publishers, 2005, pp. 4, 17, 18, 228-229.
*Dictionary of Computer Words*, Revised Edition, Houghton Mifflin Company, 1995, p. 295.

* cited by examiner

*Primary Examiner* — Tuyetlien T Tran
(74) *Attorney, Agent, or Firm* — Woodcock Washburn LLP (57) ABSTRACT

The present invention includes systems for and methods of visually integrating application windows in a virtual machine environment. Embodiments of the present invention are directed to a system for and method of visually integrating application windows of host and guest operating system in a virtual machine environment in order to reduce difficulties that the users of computers experience in navigating between applications in a virtual machine environment. The present invention accomplishes this by using a composite window list in the virtual machine monitor (VMM) to manage the configuration, the focus, the geometry, the Z-order of the windows across guest and host operating systems, and the arrangement of doppelgangers (virtual application windows, in this case) in a way that allows host and guest application windows to appear integrated in a single display window.

15 Claims, 7 Drawing Sheets

SYSTEMS AND METHODS FOR INTEGRATING APPLICATION WINDOWS IN A VIRTUAL MACHINE ENVIRONMENT

CROSS-REFERENCE

This application is related by subject matter to the inventions disclosed in the following commonly assigned application: U.S. patent application Ser. No. 10/883.491, filed on Jun. 30, 2004, entitled "SYSTEMS AND METHODS FOR PROVIDING SEAMLESS SOFTWARE COMPATIBILITY USING VIRTUAL MACHINES," the entirety of which is hereby incorporated by reference herein.

FIELD OF THE INVENTION

The present invention generally relates to the field virtual machines (also known as "processor virtualization") and software that executes in a virtual machine environment. More specifically, the present invention is directly to integration of application windows from host and guest operating systems in a single display.

BACKGROUND OF THE INVENTION

Computers include general purpose central processing units (CPUs) that are designed to execute a specific set of system instructions. A group of processors that have similar architecture or design specifications may be considered to be members of the same processor family. Examples of current processor families include the Motorola 680X0 processor family, manufactured by Motorola, Inc. of Phoenix, Ariz.; the Intel 80X86 processor family, manufactured by Intel Corporation of Sunnyvale, Calif.; and the PowerPC processor family, which is manufactured by Motorola, Inc. and used in computers manufactured by Apple Computer, Inc. of Cupertino, Calif. Although a group of processors may be in the same family because of their similar architecture and design considerations, processors may vary widely within a family according to their clock speed and other performance parameters.

Each family of microprocessors executes instructions that are unique to the processor family. The collective set of instructions that a processor or family of processors can execute is known as the processor's instruction set. As an example, the instruction set used by the Intel 80X86 processor family is incompatible with the instruction set used by the PowerPC processor family. The Intel 80X86 instruction set is based on the Complex Instruction Set Computer (CISC) format. The Motorola PowerPC instruction set is based on the Reduced Instruction Set Computer (RISC) format. CISC processors use a large number of instructions, some of which can perform rather complicated functions, but which require generally many clock cycles to execute. RISC processors use a smaller number of available instructions to perform a simpler set of functions that are executed at a much higher rate.

The uniqueness of the processor family among computer systems also typically results in incompatibility among the other elements of hardware architecture of the computer systems. A computer system manufactured with a processor from the Intel 80X86 processor family will have a hardware architecture that is different from the hardware architecture of a computer system manufactured with a processor from the PowerPC processor family. Because of the uniqueness of the processor instruction set and a computer system's hardware architecture, application software programs are typically written to run on a particular computer system running a particular operating system.

Computer manufacturers want to maximize their market share by having more rather than fewer applications run on the microprocessor family associated with the computer manufacturers' product line. To expand the number of operating systems and application programs that can run on a computer system, a field of technology has developed in which a given computer having one type of CPU, called a host, will include an emulator program that allows the host computer to emulate the instructions of an unrelated type of CPU, called a guest. Thus, the host computer will execute an application that will cause one or more host instructions to be called in response to a given guest instruction. Thus the host computer can both run software design for its own hardware architecture and software written for computers having an unrelated hardware architecture. As a more specific example, a computer system manufactured by Apple Computer, for example, may run operating systems and program written for PC-based computer systems. It may also be possible to use an emulator program to operate concurrently on a single CPU multiple incompatible operating systems. In this arrangement, although each operating system is incompatible with the other, an emulator program can host one of the two operating systems, allowing the otherwise incompatible operating systems to run concurrently on the same computer system.

When a guest computer system is emulated on a host computer system, the guest computer system is said to be a "virtual machine" as the guest computer system only exists in the host computer system as a pure software representation of the operation of one specific hardware architecture. The terms emulator, virtual machine, and processor emulation are sometimes used interchangeably to denote the ability to mimic or emulate the hardware architecture of an entire computer system. As an example, the Virtual PC software created by Connectix Corporation of San Mateo, Calif. emulates an entire computer that includes an Intel 80X86 Pentium processor and various motherboard components and cards. The operation of these components is emulated in the virtual machine that is being run on the host machine. An emulator program executing on the operating system software and hardware architecture of the host computer, such as a computer system having a PowerPC processor, mimics the operation of the entire guest computer system.

The emulator program acts as the interchange between the hardware architecture of the host machine and the instructions transmitted by the software running within the emulated environment. This emulator program may be a host operating system (HOS), which is an operating system running directly on the physical computer hardware. Alternately, the emulated environment might also be a virtual machine monitor (VMM) which is a software layer that runs directly above the hardware and which virtualizes all the resources of the machine by exposing interfaces that are the same as the hardware the VMM is virtualizing (which enables the VMM to go unnoticed by operating system layers running above it). A host operating system and a VMM may run side-by-side on the same physical hardware.

Typically, within the host computer system which is emulating one or more virtual machines (VMs), there is no direct mechanism in the host environment, such as an icon on the desktop, to launch or in some way interact with applications that are running on any given VM. Rather, a VM is presented to the user on the host computer system in a separate window that displays the desktop of the guest OS in its native environment, whether it is a legacy or modern OS. Consequently, the user sees a completely separate desktop (e.g., with a separate task bar, "My Computer," Start Menu) from that of the host computer system. Using this separate VM window, the user may navigate within the guest OS to launch any VM application which, when launched, is likewise displayed in the same VM window. If the host computer system is hosting multiple VMs, the desktop of each VM will appear in a separate window. As a result, in order for the user to interact with each VM, the user must navigate from one VM window to the next. It is cumbersome for the user to navigate from the host desktop to one or more separate VM desktops to invoke host or VM applications simultaneously, as the user must continuously swap between one window and another and must keep track of which application is running in which window. What is needed is a mechanism for invoking one or more host or guest OS applications and displaying them alongside each other in a single display, rather than in a separate VM window, and thereby provide the user with an improved, more seamless method of interacting with one or more VMs resident on a host computer system.

SUMMARY OF THE INVENTION

The present invention includes systems for and methods of integrating application windows in a virtual machine environment.

Embodiments of the present invention are directed to a system for and method of integrating application windows of a host and guest operating system in a virtual machine environment in order to reduce difficulties that users of computers experience when navigating between applications in a virtual machine environment. The present invention accomplishes this by using a composite window list managed by the VMM to manage the configuration, the focus, the geometry, the Z-order of the windows across guest and host OSes, and the arrangement of doppelgangers (virtual application windows, in this case) in a way that allows host and guest application windows to appear in a single display window. This creates a much improved user interface for the users of virtual machines, because there is no longer any need for the user of a virtual machine to know whether a particular application that the user wants to run is operating in the host or guest operating system.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Figure 1:
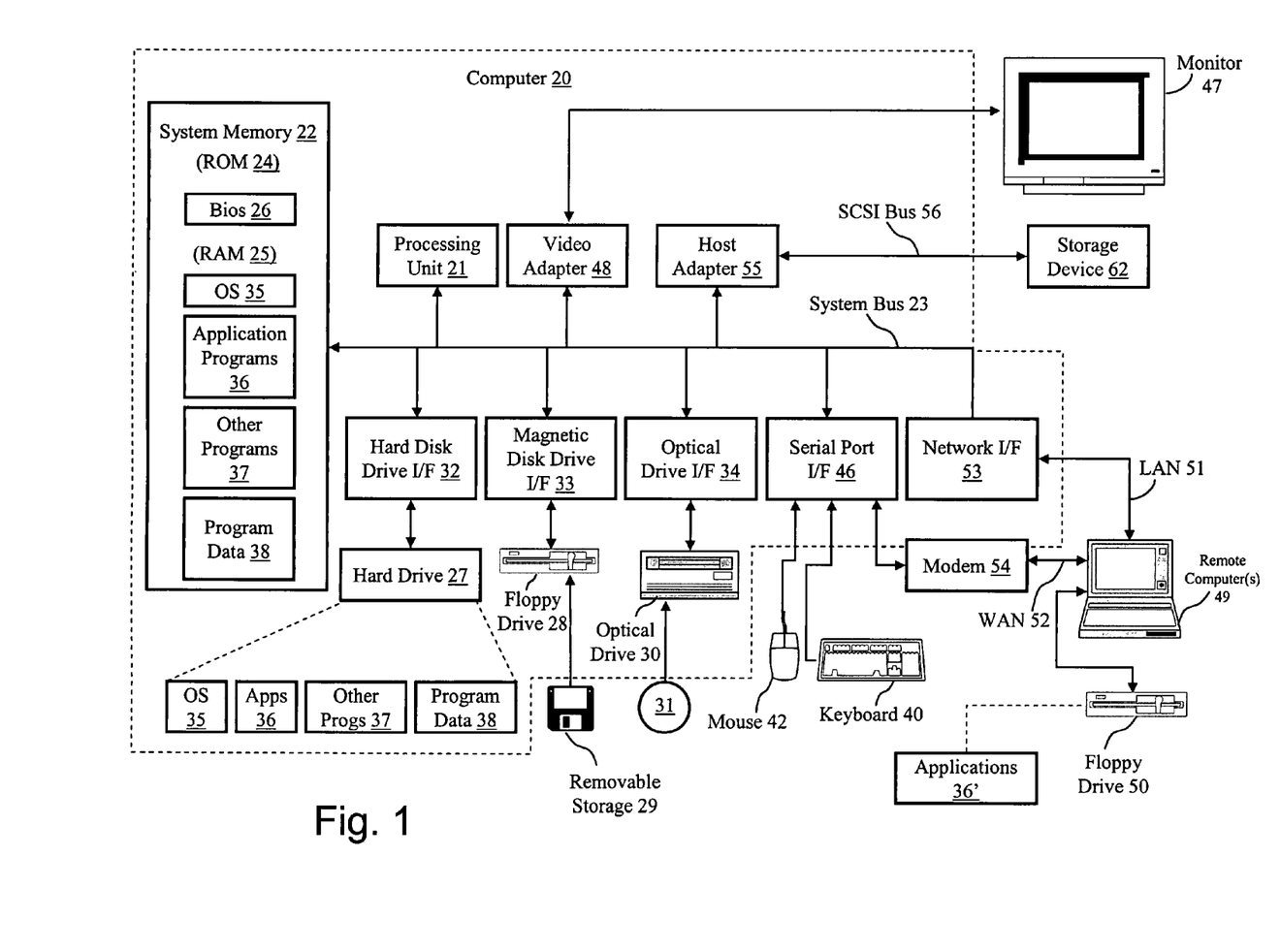
FIG. 1 is a block diagram representing a computer system in which aspects of the present invention may be incorporated.

The inventive subject matter is described with specificity to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described.
Computer Environment Numerous embodiments of the present invention may execute on a computer. FIG. 1 and the following discussion is intended to provide a brief general description of a suitable computing environment in which the invention may be implemented. Although not required, the invention will be described in the general context of computer executable instructions, such as program modules, being executed by a computer, such as a client workstation or a server. Generally, program modules include routines, programs, objects, components, data structures and the like that perform particular tasks or implement particular abstract data types. Moreover, those skilled in the art will appreciate that the invention may be practiced with other computer system configurations, including hand held devices, multi processor systems, microprocessor based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the personal computer 20, such as during start up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers. The exemplary system of FIG. 1 also includes a host adapter 55, Small Computer System Interface (SCSI) bus 56, and an external storage device 62 connected to the SCSI bus 56.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise wide computer networks, intranets and the Internet.

When used in a LAN networking environment, the personal computer 20 is connected to the LAN 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used. Moreover, while it is envisioned that numerous embodiments of the present invention are particularly well-suited for computerized systems, nothing in this document is intended to limit the invention to such embodiments.

Virtual Machines

From a conceptual perspective, computer systems generally comprise one or more layers of software running on a foundational layer of hardware. This layering is done for reasons of abstraction. By defining the interface for a given layer of software, that layer can be implemented differently by other layers above it. In a well-designed computer system, each layer only knows about (and only relies upon) the immediate layer beneath it. This allows a layer or a "stack" (multiple adjoining layers) to be replaced without negatively impacting the layers above said layer or stack. For example, software applications (upper layers) typically rely on lower levels of the operating system (lower layers) to write files to some form of permanent storage, and these applications do not need to understand the difference between writing data to a floppy disk, a hard drive, or a network folder. If this lower layer is replaced with new operating system components for writing files, the operation of the upper layer software applications remains unaffected.

The flexibility of layered software allows a virtual machine (VM) to present a virtual hardware layer that is in fact another software layer. In this way, a VM can create the illusion for the software layers above it that said software layers are running on their own private computer system, and thus VMs can allow multiple "guest systems" to run concurrently on a single "host system."

Figure 2:
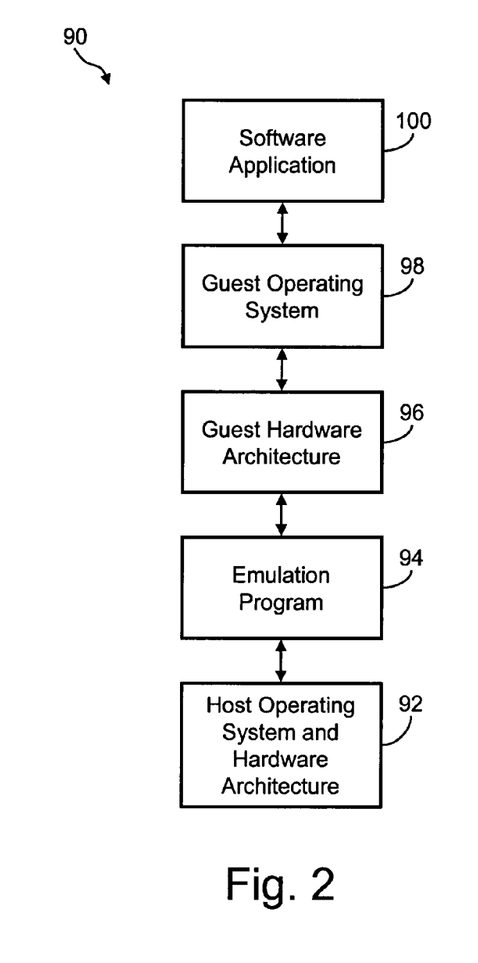
FIG. 2 illustrates the logical layering of the hardware and software architecture for an emulated operating environment in a computer system.

FIG. 2 is a diagram representing the logical layering of the hardware and software architecture for an emulated operating environment in a computer system. An emulation program 94 runs on a host operating system and/or hardware architecture 92. Emulation program 94 emulates a guest hardware architecture 96 and a guest operating system 98. Software application 100 in turn runs on guest operating system 98. In the emulated operating environment of FIG. 2, because of the operation of emulation program 94, software application 100 can run on the computer system 90 even though software application 100 is designed to run on an operating system that is generally incompatible with the host operating system and hardware architecture 92.

Figure 3A:
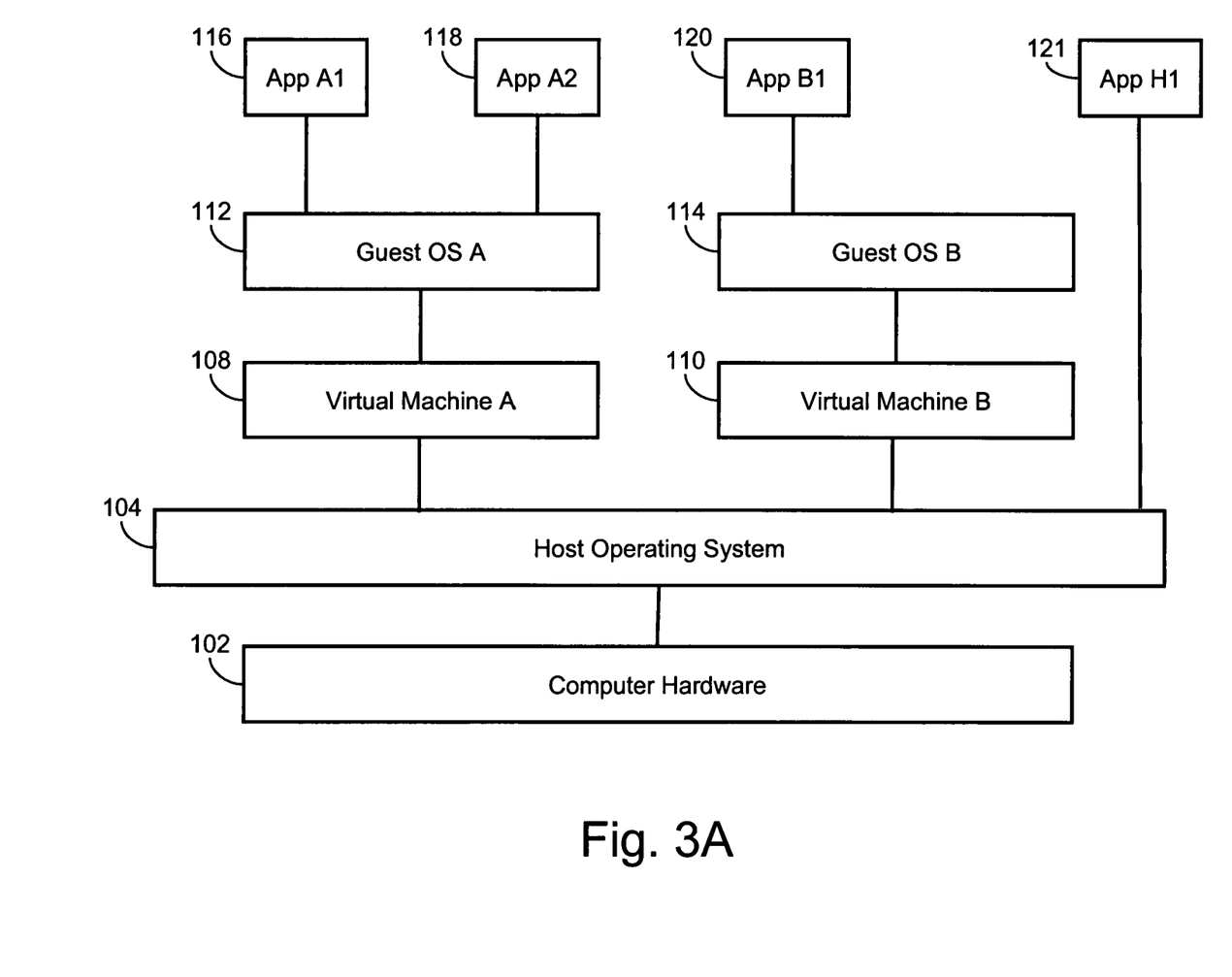
FIG. 3A illustrates a virtualized computing system.

FIG. 3A illustrates a virtualized computing system comprising a host operating system software layer 104 running directly above physical computer hardware 102, and the host operating system (host OS) 104 virtualizes all the resources of the machine by exposing interfaces that are the same as the hardware the host OS is virtualizing (which enables the host OS to go unnoticed by operating system layers running above it).

Figure 3B:
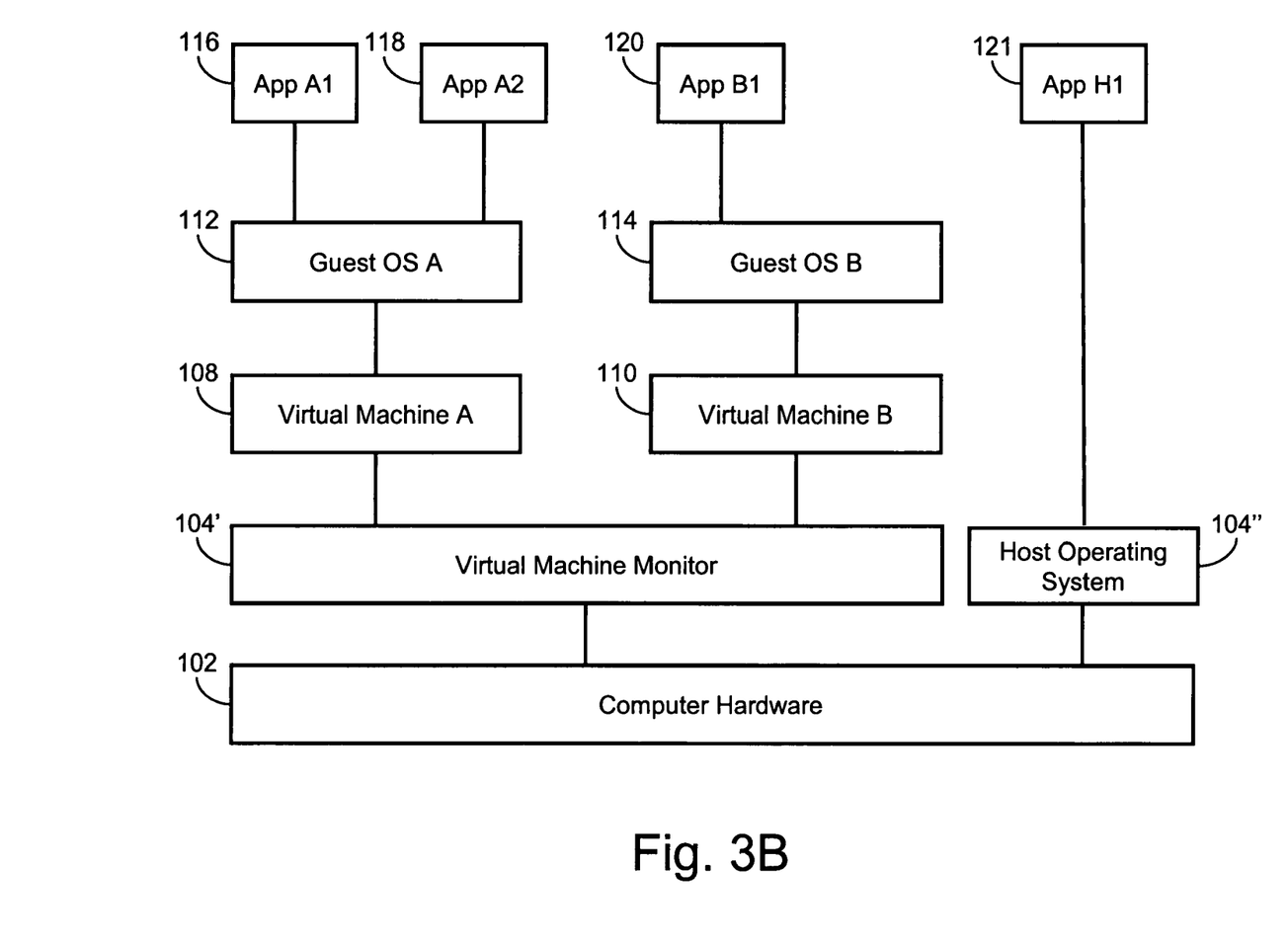
FIG. 3B illustrates an alternative embodiment of a virtualized computing system comprising a virtual machine monitor running alongside a host operating system.

Alternately, a virtual machine monitor, or VMM, software layer 104' may be running in place of or alongside a host operating system 104", the latter option being illustrated in FIG. 3B. For simplicity, all discussion hereinafter (specifically regarding the host operating system 104) shall be directed to the embodiment illustrated in FIG. 3A; however, every aspect of such discussion shall equally apply to the embodiment of FIG. 3B wherein the VMM 104' of FIG. 3B essentially replaces, on a functional level, the role of the host operating system 104 of FIG. 3A described herein below.

Referring again to FIG. 3A, above the host OS 104 (or VMM 104') are two virtual machine (VM) implementations, VM A 108, which may be, for example, a virtualized Intel 386 processor, and VM B 110, which may be, for example, a virtualized version of one of the Motorola 680X0 family of processors. Above each VM 108 and 110 are guest operating systems (guest OSes) A 112 and B 114 respectively. Above guest OS A 112 are running two applications, application A1 116 and application A2 118, and above guest OS B 114 is application B1 120. Above host OS 104 is application H1 121.

Visual Integration

Figure 4A:
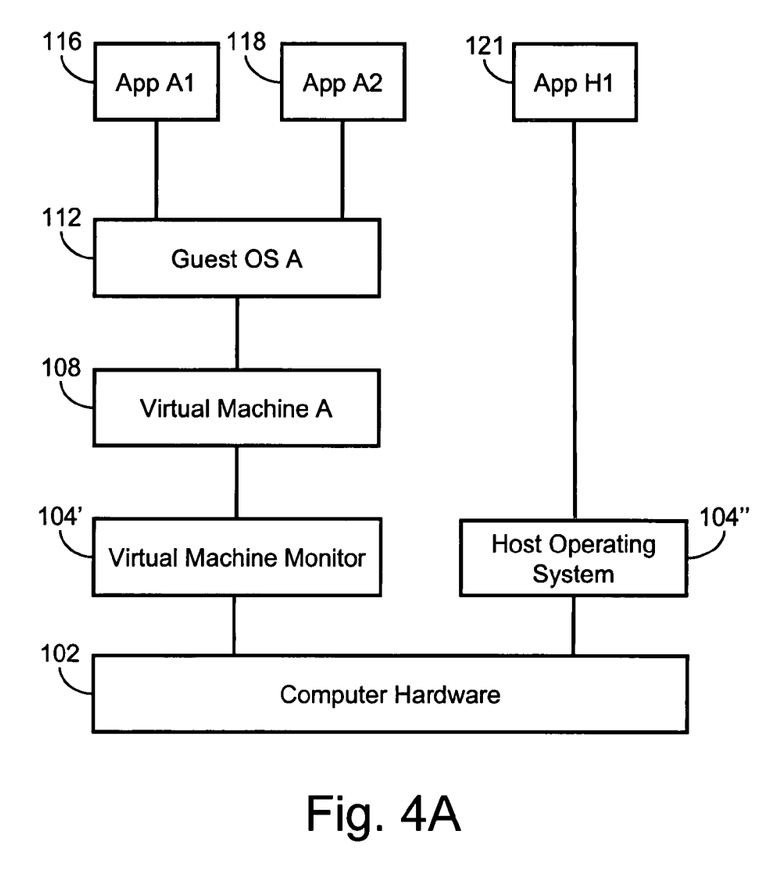
FIG. 4A is a simpler version of the system illustrated in FIG. 3B with only a single VM running a total of two applications.
Figure 4B:
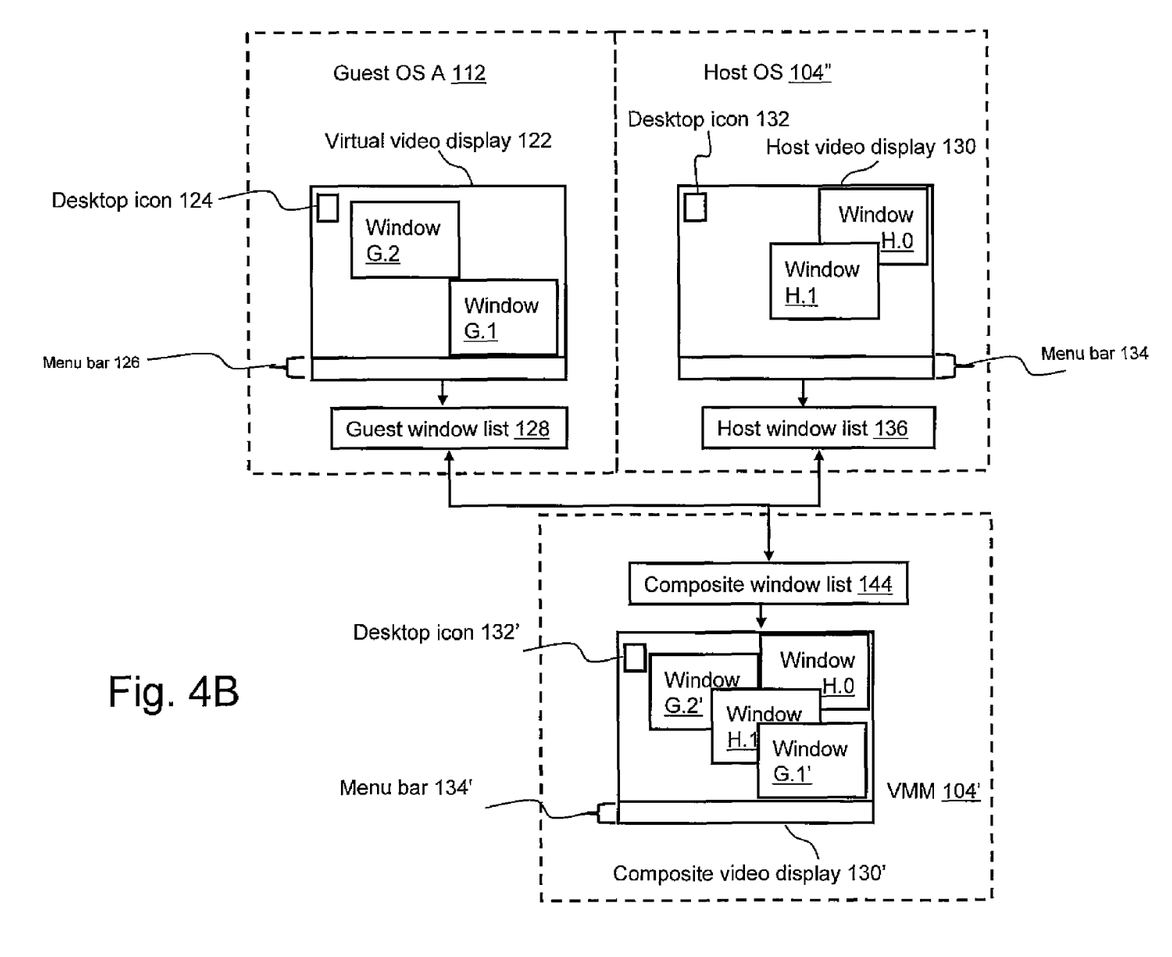
FIG. 4B illustrates a block diagram representing the system of FIG. 4A in regard to individual logical displays for both the VM, the host OS, as well as a composite display for visually integrating application windows of the host operating system and guest operating system for several embodiments of the present invention.

FIG. 4A is a simpler version of the system illustrated in FIG. 3B with only a single VM running a total of two applications. FIG. 4B illustrates a block diagram representing the system of FIG. 4A in regard to individual logical displays for both the VM, the host OS, as well as a composite display for visually integrating application windows of the host operating system and guest operating system for several embodiments of the present invention.

In regard to FIGS. 4A and 4B, guest OS A 112 further includes a virtual video display 122, which further includes a window G.1 and a window G.2 (corresponding to the display windows for applications A1 and A2 respectively), a desktop icon 124, and a menu bar 126; and a guest window list 128. Thus virtual video display 122 is the video display of application windows within guest OS A 112 such that, if guest OS A 112 was operating in a traditional computing environment (not VM), virtual video display 122 would be what the user of the computing device would see on monitor 47 (shown in FIG. 1) when operating computer 20 (shown in FIG. 1), and window G.1 and window G.2 are application windows that operate within guest OS A 112. In one example referring to FIG. 4A, window G.1 represents application A1 116, which is running MS Internet Explorer™ and window G.2 represents application A2 118, which is running MS Access™. Desktop icon 124 represents the totality of all desktop icons available within guest OS A 112. In one example, desktop icon 124 includes a "recycle bin" icon, which is used to delete files, a "My Documents" icon, which provides a link to a directory where documents can be found more easily, and a plurality of icons that launch frequently used applications, such as, for example, MS Internet Explorer, MS Word™, MS Excel™, MS Outlook™, Corel's WordPerfect™, or IBM's Lotus Notes™. Menu bar 126 is a menu bar that provides for navigational functionality within guest OS A 112. In one example, menu bar 126 includes a "Start" button (not shown), a plurality of application buttons (not shown), and some icons that relay the status information of guest OS A 112 (such as the current time and the status of various applications). The start button on menu bar 126 provides a way for the user to launch new applications or utilities within guest OS A 112. The application buttons on menu bar 126 provide a way for the user of the system to bring application windows, such as G.1 and G.2, to the forefront of virtual video display 122 with a single mouse-click. In one example, menu bar 126 is the "task bar" in MS Windows XP™.

Guest window list 128 is a file that contains information related to the arrangement of application windows (such as windows G.1 and G.2) within guest OS A 112. Examples of the types of information in guest window list 128 are the geometrical properties associated with the application windows, such as the size of the window; the X-Y position of the window within virtual video display 122; the Z position of the window, which includes information regarding the "focused" application within guest OS A 112; and the adornments of the window (such as command buttons for minimize, maximize, and exit, as well as the design of the window's border or frame). The focused application is the software application that has the "focus" of the "cursor" (for end-user input devices). In one example, window G.1 is application A1 116 running MS Word and the focus of the cursor is on window G.1. In this example, any keystrokes made by an end-user are recorded in MS Word, and these key strokes are not recorded nor have any impact upon other windows, such as window G.2.

Referring again to FIGS. 4A and 4B, Host OS 104" further includes a host video display 130, which further includes a windows H.0 and H.1, a desktop icon 132, and a menu bar 134; and a host window list 136. Window H.0 is the logical display for Guest OS A 112 running on VM A 108 (the contents of which would comprise the output of virtual video display 112 which, again, is the "desktop" display for the VM). Window H.1 represents application H1 121, which, for example, may be running MS Office Project 2003™. Host window list 136 contains information related to the arrangement of application windows (such as windows H.0 and H.1) within host OS 104". However, while host video display 130 of the host OS 104" is certainly functional, it would be advantageous to an end-user if the application windows G.1 and G.2 could be "promoted" out of the limited space of the window H.0 in the host video display 130.

To this end, and as illustrated in FIG. 4B, various embodiments of the present invention comprise a composite window list 144 and a composite video display 130', which further includes a window G.1', a window H.1', a window G.2', and a window H.0', as well as a desktop icon 132', and a menu bar 134'. These various embodiments of the present invention combine information from guest window list 128 with the host window list 136 and creates composite window list 144 for display on composite video display 130'. According to the present invention, VMM 104' utilizes composite window list 144 to manage windows G.1', H.1', G.2', and H.0' across host OS 104" and guest OS A 112. In one example, as shown in FIG. 4B, the Z-order of windows in VMM 104' is window G.1', window H.1', window G.2', and window H.0'. Continuing with this example, if the user of computer 20 clicks on window G.2' within composite video display 130' by using mouse 42 (shown in FIG. 1) and thereby brings window G.2' into focus, the Z-order of windows in composite window list 144 is altered to reflect this, and these changes are sent from composite window list 144 to guest window list 128. Details of the method of operating are described in reference to FIG. 5 below.

Desktop icon 132' and menu bar 134' represent the icons and menu bar available to the user of computer 20 according to the host OS 104". In one example, host OS 104" utilizes desktop icon 132 and menu bar 134 from host OS 104", although the menu bar 134' would also reflect the additional windows that were promoted up form the virtual video display 122.

For certain embodiments of the present invention, and in regard to composite window list 144, the window adornments of host OS 104" are used to adorn all windows (including those operating on different OSes, such as window G.1' or G.2') for display on composite video display 130' (which may be different from the adornments shown for the sub-window in Window H.0). By utilizing the host's adornments, the look and feel of all windows operating within the host OS environment are consistent with a user's experience, that is, using a computer in a traditional (non-virtual machine) environment. For certain of these embodiments, the methodology is employed directly by the virtual machine monitor (VMM) by interacting with the host operating system to open a new window in the host operating system and filling that window with the contents of the corresponding window in the guest operating system. The VMM then manages both the content of the promoted window as well as the VM display in the Window H.0', while the host operating system manages its windows (including the promoted windows which, to the host OS, are indistinguishable from other windows) in its normal manner. For other embodiments, the methodology may be employed by the host operating system that provides an application programming interface to the VMM, VM, and/or guest OS specifically for this purpose. For other additional embodiments, and specifically for those where a VM is provided directly by a host OS (such as illustrated in FIG. 3A), the host OS performs all functions.

For certain alternative embodiments of the present invention, the promoted windows may utilize the window adornments of the guest operating system that is running the application. More specifically, when these applications are running in VMM 104', windows G.1' and G.2' have the adornments created by guest OS A 112, while windows H.0' and H.1' has the adornments created by host OS 104". For certain of these embodiments, the methodology is employed directly by the virtual machine monitor (VMM) by interacting with the host operating system to open a new, unadorned window (a mere shell) in the host operating system and filling that window with both contents and in-window adornments representative of the adornments found in a corresponding window in the guest operating system. The VMM then manages both the content of the promoted window as well as adornments in same, as well as manages the VM display in the Window H.0', while the host operating system manages its windows (including the promoted windows which, to the host OS, are indistinguishable from other windows, even though these windows will be a mere shell without the typical host OS adornments) in its normal manner. For other embodiments, the methodology may be employed by the host operating system that provides an application programming interface to the VMM, VM, and/or guest OS specifically for this purpose. For other additional embodiments, and specifically for those where a VM is provided directly by a host OS (such as illustrated in FIG. 3A), the host OS performs all functions.

Figure 5:
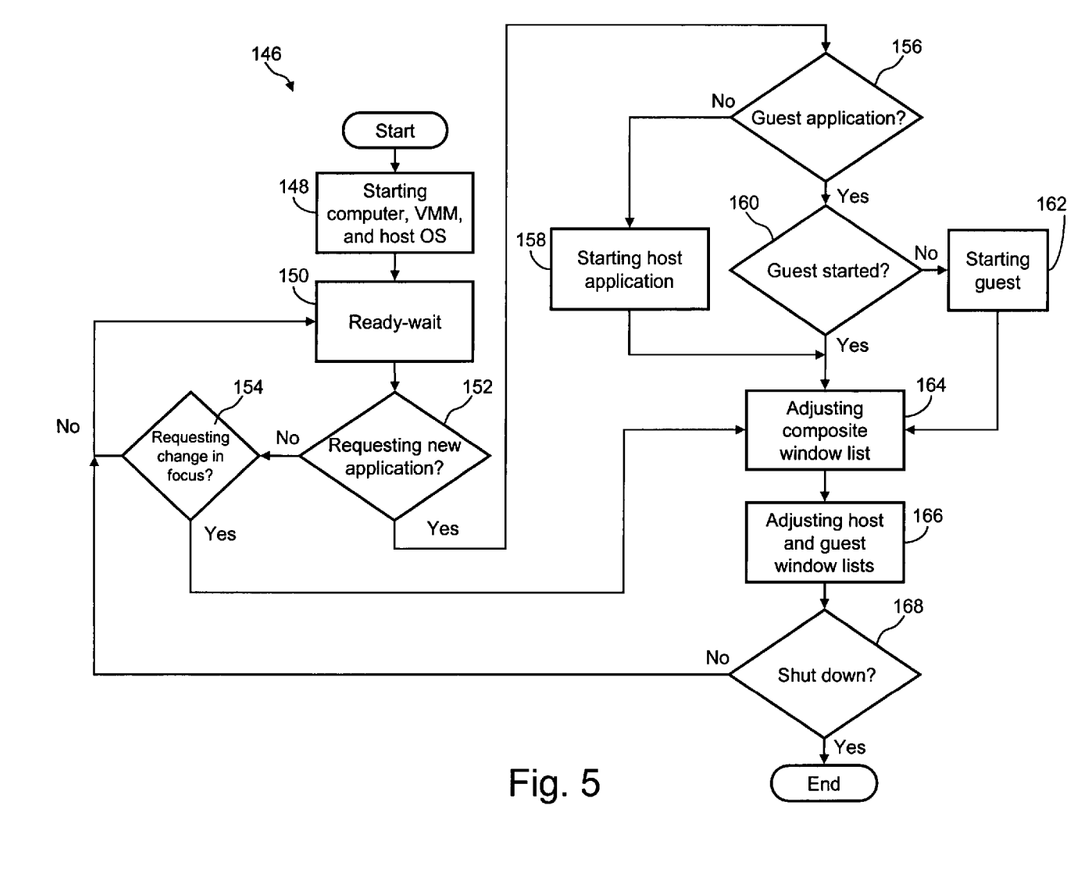
FIG. 5 is a flowchart that illustrates a method of operating a virtualized computing system with application windows integrated into a single display.

FIG. 5 is a flowchart that illustrates a method 146 of operating a virtualized computing system with visually integrated application windows. At step 148, host OS 104", VMM 104', and computer 20 are started and initialized. At step 150, host OS 104" is in ready-wait state, in which it is ready to accept commands from input devices and applications. At step 152, VMM 104' determines whether the user of computer 20 has requested that a new application start running. In one example, the user makes this request with mouse 42 by clicking the cursor onto an icon on menu bar 142. If a new application has been requested, method 146 proceeds to step 156; if not, method 146 proceeds to step 154. At step 154, VMM 104' determines whether the user of computer 20 has requested a change to the current focused window. In one example, the user makes this request with mouse 42 by clicking the cursor onto a window (such as window G.2) that is not currently the focused window. If a change in focus has been requested, method 146 proceeds to step 164; if not, method 146 returns to step 150. At step 156, VMM 104' determines whether the application requested by the user is an application that runs on host OS 104" or on a guest operating system. If the application is a run on a guest OS (such as application A1 116, which runs on guest OS A 112), method 146 proceeds to step 160; if the application is run on the host OS (such as application H1 121 running on host OS 104"), method 146 proceeds to step 158. At step 158, VMM 104' sends a request to host OS 104" to start the requested application. At step 160, VMM 104' determines whether the guest OS (such as guest OS A 112) that runs the application selected by the user in step 152 has been started. If the guest OS has already been started, method 146 proceeds to step 164; if not, method 146 proceeds to step 162. At step 162, VMM 104' starts the guest OS (such as guest OS A 112) needed to run the application selected by the user in step 152. At step 164, VMM 104' adjusts composite window list 144 to reflect changes to the arrangement of windows. At step 166, VMM 104' sends an update to either host window list 136 within host OS 104" or guest window list 128 within guest OS A 112 to reflect relevant changes in, for example, open application windows, window focus, Z-order of the windows, or arrangement of doppelgangers. At step 168, VMM 104' determines whether a shut down request has been received from the user of computer 20. In one example, the user makes this request with mouse 42 by clicking the cursor onto an icon (such as the start button) on menu bar 142 and then requesting "Shut down." If a shut down request has been received, computer 20, host OS 104", and VMM 104' shut down, and method 146 ends; if not method 146 returns to step 150.

Conclusion

The various systems, methods, and techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the indexing functionality of the present invention.

While the present invention has been described in connection with the preferred embodiments of the various figures, it is to be understood that other similar embodiments may be used or modifications and additions may be made to the described embodiment for performing the same function of the present invention without deviating there from. For example, while exemplary embodiments of the invention are described in the context of digital devices emulating the functionality of personal computers, one skilled in the art will recognize that the present invention is not limited to such digital devices, as described in the present application may apply to any number of existing or emerging computing devices or environments, such as a gaming console, handheld computer, portable computer, etc. whether wired or wireless, and may be applied to any number of such computing devices connected via a communications network, and interacting across the network. Furthermore, it should be emphasized that a variety of computer platforms, including handheld device operating systems and other application specific hardware/software interface systems, are herein contemplated, especially as the number of wireless networked devices continues to proliferate. Therefore, the present invention should not be limited to any single embodiment, but rather construed in breadth and scope in accordance with the appended claims.

Finally, the disclosed embodiments described herein may be adapted for use in other processor architectures, computer-based systems, or system virtualizations, and such embodiments are expressly anticipated by the disclosures made herein and, thus, the present invention should not be limited to specific embodiments described herein but instead construed most broadly. Likewise, the use of synthetic instructions for purposes other than processor virtualization are also anticipated by the disclosures made herein, and any such utilization of synthetic instructions in contexts other than processor virtualization should be most broadly read into the disclosures made herein.

What is claimed:

1. A method for integrating a virtual machine display associated with a virtual machine and a host operating system display associated with a host operating system that virtualizes resources of a physical computing system upon which the host operating system executes, the virtual machine comprising a guest operating system executing on the host operating system and at least one application for execution on said guest operating system, said method comprising:

upon selection for execution of said at least one application executing the at least one application in said guest operating system;

launching and promoting out of the virtual machine display a guest application window; and displaying an output of said at least one application in the promoted guest application window on said host operating system display, wherein:

inside said virtual machine display said output has a first set of adornments, and inside said promoted guest application window said output has a second set of adornments, said first set of adornments is different from said second set of adornments, said displaying an output is accomplished by using a composite window list and managed by a virtualization layer in the form of a virtual machine monitor operating in conjunction with the host operating system and comprises opening an unadorned window in the host operating system display and filling the unadorned window with adornments representative of a corresponding operating system, and said composite window list comprises a file that contains information related to the arrangement of the windows.

2. The method of claim 1 wherein said method is implemented by the host operating system.

3. The method of claim 1 wherein said first set of adornments comprises a set of adornments from the guest operating system.

4. The method of claim 1 wherein said second set of adornments comprises a set of adornments from the host operating system.

5. A system for integrating a virtual machine display associated with a virtual machine with a host operating system display associated with a host operating system that virtualizes resources of a physical computing system upon which the host operating system executes, comprising:

at least one computing device comprising a processor;

at least one memory communicatively coupled to said at least one processor when operational, the memory having stored therein a guest operating system configured to execute on the host operating system, at least one application for execution on said guest operating system, and computer-executable instructions that, when executed, cause said system to perform operations comprising:

upon selection for execution said at least one application executing said at least one application in said guest operating system;

launching and promoting out of the virtual machine display a guest application window; and displaying an output of said at least one application in the promoted guest application window on said host operating system display; wherein:

inside said virtual machine display said output has a first set of adornments, inside said promoted guest application window said output has a second set of adornments, said first set of adornments is different from said second set of adornments, said displaying an output is accomplished by using a composite window list and managed by a virtualization layer in the form of a virtual machine monitor operating in conjunction with the host operating system and comprises opening an unadorned window in the host operating system display and filling the unadorned window with adornments representative of a corresponding operating system, and said composite window list comprises a file that contains information related to the arrangement of the windows.

6. The system of claim 5 wherein said instructions are implemented by the host operating system.

7. The system of claim 5 wherein said first set of adornments comprises a set of adornments from the guest operating system.

8. The system of claim 5 wherein said second set of adornments comprises a set of adornments from the host operating system.

9. A computer storage medium comprising computer-readable instructions for integrating a virtual machine display associated with virtual machine with a host operating system display associated with host operating system that virtualizes resources of a physical computing system upon which the host operating system executes, the virtual machine comprising a guest operating system configured to execute on the host operating system, said computer-readable instructions comprising:

instructions for, upon selection for execution of an application that is native to the guest operating system, executing said application in said guest operating system;

instructions for launching and promoting out of the virtual machine display a guest application window; and instructions for displaying an output of said application in the promoted guest application window on said host operating system display, wherein:

inside said virtual machine display said output has a first set of adornments, inside said promoted guest application window said output has a second set of adornments, said first set of adornments is different from said second set of adornments, said displaying an output is accomplished by using a composite window list and managed by a virtual machine monitor operating in conjunction with the host operating system and comprises opening an unadorned window in the host operating system display and filling the unadorned window with adornments representative of a corresponding operating system, and said composite window list comprises a file that contains information related to the arrangement of the windows.

10. The computer storage medium of claim 9 further comprising instructions whereby said first set of adornments comprises a set of adornments from the guest operating system.

11. The computer storage medium of claim 9 further comprising instructions whereby said second set of adornments comprises a set of adornments from the host operating system.

12. A hardware control device for integrating a virtual machine display associated with virtual machine with a host operating system display associated with host operating system that virtualizes resources of a physical computing system upon which the host operating system executes, said virtual machine comprising a guest operating system configured to execute on the host operating system, said hardware control device comprising:

a first component for, upon selection for execution of an application that is native to the guest operating system, executing said application in said guest operating system;

a second component for launching and promoting out of the virtual machine display a guest application window; and a third component for displaying an output of said application in the promoted guest application window on said host operating system display, wherein:

inside said virtual machine display said output has a first set of adornments, inside said promoted guest application window said output has a second set of adornments, said first set of adornments is different from said second set of adornments, said displaying an output is accomplished by using a composite window list and managed by a virtual machine monitor operating in conjunction with the host operating system and comprises opening an unadorned window in the host operating system display and filling the unadorned window with adornments representative of a corresponding operating system, and said composite window list comprises a file that contains information related to the arrangement of the windows.

13. The hardware control device of claim 12 wherein said hardware control device is utilized by the host operating system.

14. The hardware control device of claim 12 whereby said first set of adornments comprises a set of adornments from the guest operating system.

15. The hardware control device of claim 12 whereby said second set of adornments comprises a set of adornments from the host operating system.

* * * * *